(No Model.)

C. W. GARLAND.
VALVE FOR TRAPS FOR WASH BASINS.

No. 306,012. Patented Sept. 30, 1884.

Attest:
Walter Donaldson
F. L. Middleton

Inventor
C. W. Garland
by Jayne & Spear
Attys.

UNITED STATES PATENT OFFICE.

CHARLES W. GARLAND, OF OAKLAND, CALIFORNIA.

VALVE FOR TRAPS FOR WASH-BASINS.

SPECIFICATION forming part of Letters Patent No. 306,012, dated September 30, 1884.

Application filed October 18, 1883. (No model.)

*To all whom it may concern:*

Be it known that I, CHARLES W. GARLAND, of Oakland, in the county of Alameda and State of California, have invented a new and useful Improvement in Valves for Traps for Wash-Basins; and I do hereby declare that the following is a full, clear, and exact description of the same.

My invention relates to float-valves for the traps of wash-basins, and like situations where the valve is to be lifted or depressed in the water, and is required to fall back or rise to its seat always in the same position.

It consists of an improved loaded glass ball-valve.

Heretofore loaded balls have been used for valves in positions such as those indicated above. These balls are made hollow, and of two hemispheres soldered together. One hemisphere is made of thicker or heavier material, or is so loaded by heavier material placed within it, and the other hemisphere is made of lighter or thinner material. Such a ball-valve will always seat itself with the heavier side down, and consequently always in the same position. Thus it may be formed by grinding it in any suitable way to fit the valve-seat. But these metal valves are liable to get out of order by wear or battering, or by corrosion. To remedy this I have sought to produce a weighted ball-valve of glass, made hollow, but with one side thicker than the other in order to give greater weight on that side. The weighted side or the side opposite is pressed or formed otherwise, with a spherical surface, so that it may fit the seat to which it always returns with the weighted side down.

Although the hollow may be made in other ways, I have devised the following, which I have found simple and effective.

Figure 1:
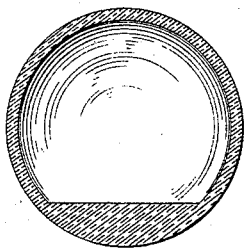
Figure 2:
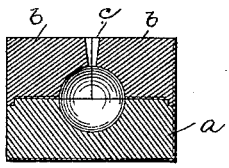

In the drawings, Figure 1 is a section of the glass ball. Fig. 2 is a section of the mold, and Fig. 3 is a plan of the same.

Figure 3:
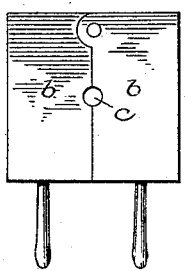

As the valve must be made hollow, I use in making it the ordinary glass blow-pipe; and in order to give the valve the proper spherical surface I use the mold shown in Figs. 2 and 3. This mold is composed of the lower half, *a*, in which the lower half of the sphere is formed. The upper half of the mold is divided across the center into parts *b b*, which are hinged so that the upper half may be thrown open. With the upper half of the mold thus thrown open, the glass on the end of the blow-pipe is placed in the cavity of the lower half, the glass having been handled in such a way (well known to those skilled in the art) as to form more glass at the lower part than elsewhere. The mold is then closed and the blowing is completed, and the upper hole is in the center of the upper quarters in the plan view shown at *c*. The hole may be closed and the parts ground off smooth in a manner well known to skilled glass-workers. This ball is adapted to be used in any of the ways in which an ordinary float-valve is used—that is to say, it may be made heavier than the water, so that it will either sink and rest upon the seat by its own gravity, in which case it will rest upon the thicker side, or it may be made lighter than the water so as to rise and rest against the upper seat, in which case it will bear against the seat with its thinner side. The thinner or thicker side is of course to be fitted to the seat according to the position for which it is intended.

What I claim is—

A glass ball-valve made hollow, with one side thicker than the other, substantially as described, and for the purpose set forth.

In testimony whereof I have signed my name to this specification in the presence of two subscribing witnesses.

CHARLES W. GARLAND.

Witnesses:
   A. A. DEXTER,
   E. BIGELOW.